United States Patent [19]
Neefe

[11] 4,231,905
[45] Nov. 4, 1980

[54] POLYMETHYLMETHACRYLATE CELLULOSIC COPOLYMER LENS MATERIAL

[75] Inventor: Charles W. Neefe, Big Spring, Tex.

[73] Assignee: Neefe Optical Laboratory, Big Spring, Tex.

[21] Appl. No.: 51,345

[22] Filed: Jun. 25, 1979

Related U.S. Application Data

[63] Continuation-in-part of Ser. No. 919,240, Jun. 26, 1978, abandoned, which is a continuation-in-part of Ser. No. 849,764, Nov. 9, 1977, Pat. No. 4,110,264, which is a continuation-in-part of Ser. No. 737,045, Oct. 29, 1976, abandoned, which is a continuation-in-part of Ser. No. 663,095, Mar. 2, 1976, abandoned, which is a continuation-in-part of Ser. No. 579,796, May 22, 1976, Pat. No. 3,957,049.

[51] Int. Cl.³ .......................... C08L 1/10; C08L 1/26
[52] U.S. Cl. ........................... 260/17 A; 351/160 R; 351/160 H
[58] Field of Search ................. 260/17 A; 351/160 R, 351/160 H

[56]     References Cited
U.S. PATENT DOCUMENTS
3,900,250   8/1975   Ivani ............................... 351/160 H FOREIGN PATENT DOCUMENTS
5130749   3/1976   Japan ................................ 351/160 H OTHER PUBLICATIONS
Amer. Jour. of Optometry and Archives of Amer. Academy of Optometry: vol. 46, Jan. 1969, "Steady State Distribution of Oxygen–Contact Lens", FAH et al.

Primary Examiner—Edward M. Woodberry

[57]     ABSTRACT

A gas permeable dimensionally stable contact lens material which is a transparent, optically clear methylmethacrylate cellulosic copolymer.

6 Claims, 2 Drawing Figures

POLYMETHYLMETHACRYLATE CELLULOSIC COPOLYMER LENS MATERIAL

RELATED APPLICATIONS

This is a continuation-in-part of application Ser. No. 919,240, filed June 26, 1978 entitled, CONTACT LENS POLYMETHYLMETHACRYLATE, now abandoned which is a continuation-in-part of application Ser. No. 849,764, filed Nov. 9, 1977 entitled, PERMEABLE POLYMETHYLMETHACRYLATE CONTACT LENS, now U.S. Pat. No. 4,110,264, which is a continuation-in-part of Ser. No. 737,045, filed Oct. 29, 1976 entitled, A PERMEABLE POLYMETHYLMETHACRYLATE, now abandoned which is a continuation-in-part of Ser. No. 663,095, filed Mar. 2, 1976, entitled, A OXYGEN PERMEABLE CONTACT LENS, now abandoned which is a continuation-in-part of application Ser. No. 579,796, filed May 22, 1976 entitled, A RECHARGEABLE DRUG DELIVERY METHOD, now U.S. Pat. No. 3,957,049.

THE PRIOR ART

Contact lenses that are being used at this time depend upon the flow of lachrymal fluids around the edge of the lens to supply the cornea with its necessary oxygen. The cornea tissue maintains a temperature much lower than the other body tissues. This is due to evaporation at the corneal surface, and the lack of blood supply to the cornea which warms the rest of the body. The temperature of the cornea must be at this lower level or its metabolic processes will be acelerated. The plastic now being used for fabricating contact lenses is a very poor conductor of heat. This insulating material covering a large percent of the corneal area raises its temperature which increases the chemical activity of the metabolic processes and the cornea demands more oxygen to maintain normal metabolism. The present lenses prelude the free exchange of atmospheric oxygen dissolved in the pre-corneal fluid from reaching the corneal tissue. The result is edema and epithelium disorganization.

Lenses have been made with small holes drilled through the lens in an effort to overcome this problem. If the holes are large, they will be seen by the wearer, and if small enough not to be seen, they become clogged with body secretions and are rendered useless.

SUMMARY OF THE INVENTION

According to the invention, a contact lens is provided which is made of a transparent permeable material which will provide gaseous exchange of both oxygen and carbon dioxide, through the transparent permeable lens, to the outer surface of lens in contact with the atmosphere. It is preferred that at least a portion of the lens have a thickness of no greater than one-thousandth of an inch to thereby provide maximum gaseous exchange through the transparent permeable lens.

An additional objective is to provide a lower wetting angle whereby the tears will form a smooth layer on the lens surface. Cellulosics including cellulose acetate butyrate have been used to produce gas permeable contact lenses, however, the dimensional stability of the cellulosics is not sufficient to provide long term use without severe warpage of the lens shape. The loss of shape destroys the usefulness of the lens and limits the useful life of the lens.

The combination of methylmethacrylate and cellulosics provides an unexpected increase in dimensional stability. Cellulosics are inherently dimensional unstable. Methylmethacrylate is one of the more stable materials, however the copolymer of methylmethacrylate and a cellulosic provides a material of higher strength and stability than methylmethacrylate. The contact angle or wettability of the copolymer is also better than polymethylmethacrylate. The recovery from flexing is much faster and more complete than polymethylmethacrylate. As little as 2% cellulosic greatly improves the stability and flex recovery of methylmathacrylate.

The improved dimensionally stable contact lens material provides oxygen to the corneal surface and the removal of carbon dioxide by dissolving the gases into the lens material.

Present corneal contact lenses must be fitted with the peripheral zone flatter than the cornea in order to provide lachrymal flow and oxygen to the apex of the cornea. This clearance created around the edge allows the lens to move about the cornea and may be forced off center by the action of the upper lid, also lid sensation and discomfort result from edge stand-off. With the present corneal contact lenses, no fixed alignment between the optical center of the contact lens and eye is possible.

This new permeable lens allows the dissolved gasses to pass through the lens material; therefore, the lens may be fitted in true contact with the corneal surface from center to edge. The corneal surface is not spherical therefore no movement of the lens will be possible if the lens is in contact with the cornea from center to edge providing improved comfort. This permeable flow differs from passage through holes drilled in the lens in that the atmosphere gases dissolve into the molecular structure of the lens and diffuses into and permeates the lens structure.

This new lens design may be employed as a theraputic device by adding the required medication to the lens material. The medication will be dissolved slowly by the lachrymal fluids and find its way to the corneal tissue by diffusion to the surface of the lens. With this lens, long-lasting and highly effective medications are now possible.

DESCRIPTION OF THE DRAWINGS

This invention can be more easily understood from a study of the drawings in which.

Figure 1:
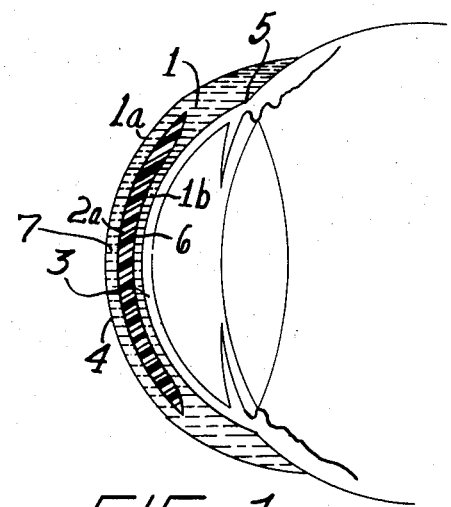
FIG. 1 is a cross sectional view of the gas permeable contact lens of this invention in place of the cornea, having a positive refraction power and being of the size smaller than the cornea.
Figure 2:
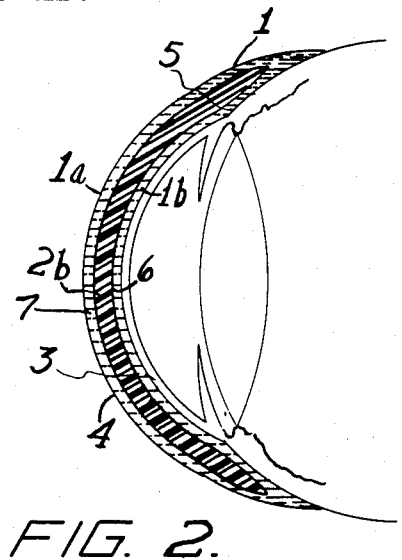
FIG. 2 is a cross sectional view of the gas permeable contact lens of this invention in place on the cornea, and having a positive refraction power and a size larger than the cornea. The larger size makes this lens an excellent post-operative dressing. For this purpose, the thickness may be increased to provide an even pressure to all parts of the cornea.

It is noted that with exception of lenses 2a and 2b, respectively, the various parts and features having similar functions which are shown in FIGS. 1 and 2, are refered to with the same characters. Lenses 2a and 2b illustrate transparent permeable contact lenses having positive refractive powers. Lens 2b differs from lens 2a in that the outer periphery thereof rests on area 5 (FIG. 2) which is outside the limbus. Lens 2b is useful as a postoperative dressing for corneal surgical cases. Lens 2a is a similar transparent permeable lens, except it is thinner at its periphery. In all other respects, the lenses are similar bodies. A concave inner corneal surface 6 is shaped to lie upon and conform to the curvature of the cornea 3. The lachrymal film 1 surrounds the respective lens and covers the surface of the cornea. Film 1a covers anterior surface and is in contact with the atmosphere 4 and film 1b contact posterior surface 6 and the corneal surface.

DESCRIPTION OF THE PREFERRED EMBODIMENT

The oxygen consumption rate of the human cornea is approximated to be 2.8 ml/cm$^2$-hr. This value has been determined by Jauregui and Fatt, "Estimation of the Vivo Oxygen Consumption of the Human Corneal Epithelium", in the American Journal of Optometry and Archives of American Academy of Optometry, June 1972, page 507.

The herein disclosed material is of monomeric methylmethacrylate copolymerized with a cellulose ether or ester polymer. The material is firm and ridged having the appearance and feel of conventional polymethymethacrylate. The material is made by adding soluble cellulosic polymer to the methylmethacrylate monomer. The mixture must meet three requirements: (1) It must be miscible or soluble in methylmethacrylate monomer. (2) The cellulosic polymer must not prevent the polymerization of the methylmethacrylate. (3) The final polymer must be transparent.

Several cellulosic solid polymers have been found to meet these requirements, examples are ethyl cellulose, cellulose acetate, cellulose acetate propionate, cellulose acetate butyrate and cellulose nitrate which may be used individually or in combination in amounts ranging from 2% to 80% by weight of the methylmethacrylate monomer.

The material is prepared as follows which is a typical example of the proceedures employed. To inhibitor free methylmethacrylate monomer 10% by weight cellulose acetate butyrate is added and 0.25% by weight of the catalyst 2,2'-Axobis (2-methylpropionitrile) was added. The mixture was purged of atmospheric oxygen and placed under a nitrogen blanket. The mixture was placed in glass tubes 14 m/m in diameter and 160 m/m long. The filled and sealed tubes were placed in a water bath at 55° C. for 24 hours.

The material polymerized to form clear rods. The glass tubes were removed and post cured at 70° C. for 12 hours. The rods are turned to 0.50 inch diameter in an atlas lathe. The 0.50 inch rods are cut into 0.25 inch thick discs and made into contact lenses by the methods well known to the art. The finished lenses were hydrated 24 hours in distilled water at 70° C. with continuous agitation. The finished lenses were placed on the cornea of the eye.

Various modifications, of course, can be made without departing from the spirit of this invention or the scope of the appended claims. It is understood that many variations are obtainable which will yield materials as disclosed herein. The constants set forth in this disclosure are given as examples and are in no way final or binding.

What is claimed is:

1. A gas permeable, dimensionally stable, optically clear contact lens material made by the steps of dissolving in monomeric methylmethacrylate 2% to 80% by weight of the methylmethacrylate of a soluble solid cellulose ether or ester polymer material which does not prevent the polymerization of the monomeric methylmethacrylate, polymerizing the methylmethacrylate cellulosic solution to form a ridged transparent contact lens material which has a faster recovery from being flexed than a polymethylmethacrylate or a cellulosic contact lens material.

2. A material as in claim 1 wherein the soluble cellulosic material is Ethyl Cellulose.

3. A material as in claim 1 wherein the soluble cellulosic material is Cellulose Acetate.

4. A material as in Claim 1 wherein the soluble cellulosic material is Cellulose Acetate Propionate.

5. A material as in claim 1 wherein the soluble cellulosic material is Cellulose Acetate Butyrate.

6. A material as in cliam 1 wherein the soluble cellulosic material is Cellulose Nitrate.

* * * * *